United States Patent [19]

Johnson et al.

[11] Patent Number: 4,487,535
[45] Date of Patent: Dec. 11, 1984

[54] GEAR SHAPING MACHINE

[75] Inventors: Stuart J. Johnson; George E. Fransson, both of Rockford, Ill.

[73] Assignee: Barber-Colman Company, Rockford, Ill.

[21] Appl. No.: 473,724

[22] Filed: Mar. 9, 1983

[51] Int. Cl.³ .............................................. B23F 5/14
[52] U.S. Cl. ........................................ 409/60; 409/58
[58] Field of Search .................... 409/1, 10, 49, 58, 60, 409/59, 22, 23

[56] References Cited

U.S. PATENT DOCUMENTS

| | | | |
|---|---|---|---|
| 219,892 | 9/1879 | Albro | 409/23 |
| 1,489,222 | 4/1924 | Rice | 409/58 |
| 1,714,109 | 5/1929 | Schurr | 409/22 |
| 1,879,196 | 9/1932 | Greene | 409/13 |
| 2,465,707 | 3/1949 | Braun | 409/60 |
| 2,674,924 | 4/1954 | Nielsen | 409/60 |
| 3,012,480 | 12/1961 | Wildhaber | 409/58 |
| 3,460,431 | 8/1969 | Birch | 409/60 |

Primary Examiner—William R. Briggs
Attorney, Agent, or Firm—Leydig, Voit, Osann, Mayer & Holt, Ltd.

[57] ABSTRACT

The gear shaping machine is of simplified construction and is dedicated essentially to forming only a single type of gear or a narrow range of gears. To enable the machine to be of simplified construction, the drive train between the cutter and work spindles consists of only four gears in a machine for cutting internal gears and consists of only four gears and a direction-changing idler in a machine for cutting external gears. Relative infeeding of the cutter and the work blank is effected by pivoting one of the spindles relative to the other spindle with one of the drive gears walking around another one of the drive gears during such pivoting. The differential rotation of the spindles produced by the pivoting action is negated in order to keep the spindles in proper rotational relationship.

13 Claims, 8 Drawing Figures

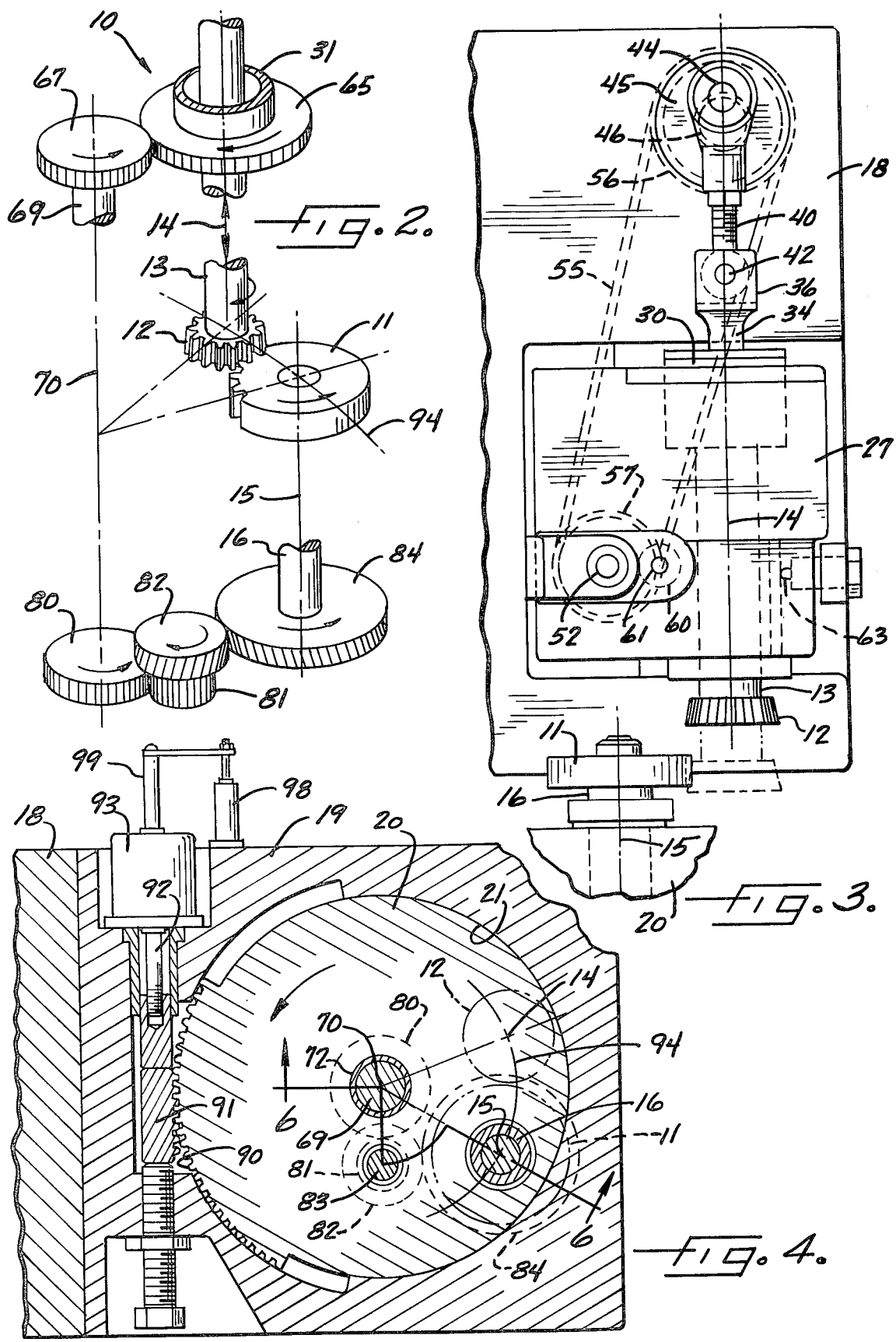

GEAR SHAPING MACHINE

BACKGROUND OF THE INVENTION

This invention relates to a gear shaping machine of the type in which a toothed shaping cutter on a rotatable cutter spindle is reciprocated back and forth relative to a workpiece on a rotatable work spindle in order to form gear teeth or the like on the workpiece. The two spindles are rotated in timed relation with one another to cause the gear teeth to be spaced around the periphery of the workpiece and to equalize the wear of the teeth of the shaping cutter. As the cutter is reciprocated, it is moved laterally toward and away from the workpiece in order to cause the cutter to engage the workpiece during an active cutting stroke and to clear the workpiece with relief during an inactive return stroke. Also, a relative infeeding motion is imparted to the cutter and the workpiece in order to increase the depth of cut of the cutter into the workpiece as the gear teeth are generated.

Most present-day commercial gear shaping machines are adapted to be used with several different types and sizes of shaping cutters and are adapted to be changed over to enable the formation of a wide range of different types and sizes of gears. While such a machine is extremely versatile, that very versatility causes the overall construction of the machine to be both complex and expensive. For example, an elaborate gear train with several sets of change gears is required for driving the cutter and work spindles in the various timed relationships necessary to form different types of gears. Also, various other adjustment features add to the cost and complexity of the machines. Such cost and complexity are of little value to a gear manufacturer who wishes to make only a single type of gear or a very narrow range of gears.

SUMMARY OF THE INVENTION

The general aim of the present invention is to provide a new and improved gear shaping machine which is dedicated to forming only a single type of gear or a very narrow range of gears and which is characterized particularly in that it is simpler and less expensive than prior commercially available gear shaping machines.

A further object of the invention is to provide a gear shaping machine with a simplified drive train adapted to rotate the cutter and work spindles in timed relationship and having a relatively small number of drive gears which are uniquely arranged to enable the infeeding to be achieved by pivoting one of the spindles relative to the other spindle.

A more detailed object is to provide a gear shaping machine in which one of the spindles, preferably the work spindle, is pivotally mounted to swing about the connecting shaft of the drive train in order to enable relative infeeding of the cutter and the workpiece. During infeeding, one of the gears of the drive train uniquely walks around another one of the gears to permit pivotal movement of the spindle.

A further object of the invention is to impart supplemental rotation to one of the spindles separate from the rotation imparted to that spindle by the main spindle drive in order to compensate for differential rotation occurring between the cutter and the workpiece during pivotal infeeding.

These and other objects and advantages of the invention will become more apparent from the following detailed description when taken in conjunction with the accompanying drawings.

BRIEF DESCRIPTION OF THE DRAWINGS

FIG. 2 is a schematic view of the drive train for the cutter and work spindles of the machine shown in FIG. 1.

FIG. 3 is a fragmentary side elevational view of the machine as taken substantially along the line 3—3 of FIG. 1.

FIG. 4 is a fragmentary cross-section taken substantially along the line 4—4 of FIG. 1.

DETAILED DESCRIPTION OF THE PREFERRED EMBODIMENTS

Figure 1:
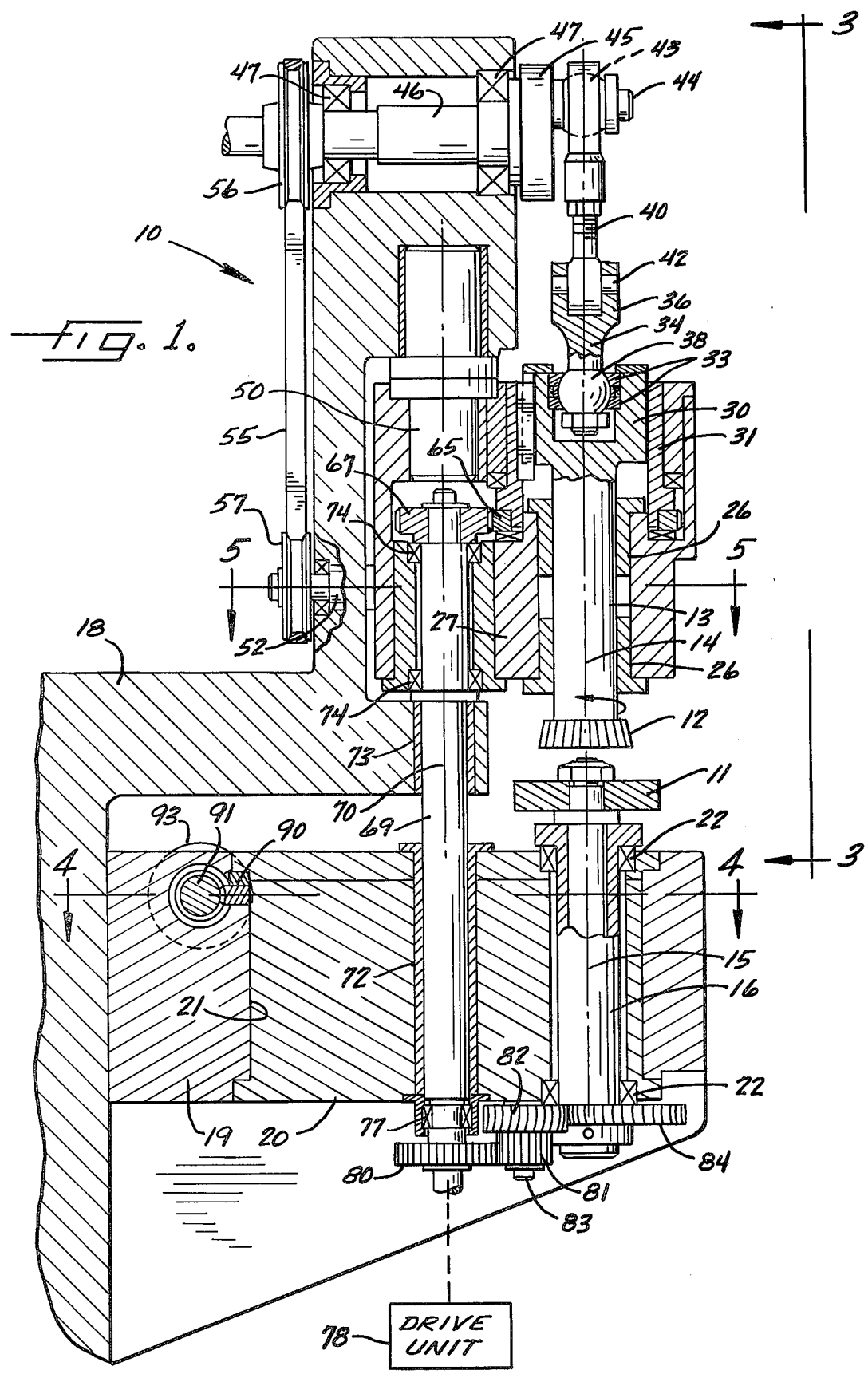
FIG. 1 is a cross-sectional view taken vertically through one embodiment of a new and improved gear shaping machine incorporating the unique features of the present invention.

As shown in the drawings for purposes of illustration, the invention is embodied in a gear shaping machine 10 for forming gear teeth around the outer periphery of a cylindrical workpiece or gear blank 11. The machine includes a conventional toothed gear shaping cutter 12 secured to and coaxial with the lower end of a cutter spindle 13 adapted to rotate about a vertical axis coinciding with the axis 14 of the spindle. The axis 14 of the cutter spindle 13 is offset radially from and extends parallel to the axis 15 of a rotatable work spindle 16 for holding the gear blank 11.

During a typical shaping operation, the cutter 12 is reciprocated downwardly and upwardly past the periphery of the gear blank 11. As the cutter is shifted downwardly through an active cutting stroke, its teeth engage the periphery of the gear blank to form gear teeth thereon. The cutter then is moved laterally away from the gear blank in order to provide clearance or relief between the cutter teeth and the newly formed gear teeth preparatory to the cutter being shifted upwardly past the gear blank through an inactive return stroke. Upon completing the return stroke, the cutter is moved laterally toward the gear blank to re-locate the cutter in a position to again cut the blank during the next active stroke of the cutter.

As the cutter 12 is reciprocated, the gear blank 11 is rotated about the axis 15 of the work spindle 16 in order to cause the cutter to form gear teeth around the periphery of the blank. In addition, the cutter is rotated in the opposite direction about the axis 14 of the cutter spindle 13 in timed relation with the rotation of the gear blank so as to cause the cutter to cut around its entire periphery and thereby equalize the wear on the cutter teeth. During reciprocation and rotation of the cutter and rotation of the gear blank, relative infeeding of the cutter and the gear blank is effected in order to gradually increase the depth of cut of the cutter into the blank.

More specifically, the machine 10 includes a main base 18 (FIG. 1) which supports an arm 19. A cylindrical housing 20 is disposed within a cylindrical bore 21 in the arm and includes bearings 22 which support the work spindle 16 for rotation about a vertical axis.

The cutter spindle 13 is supported to rotate and slide upwardly and downwardly within sleeve bearings 26 (FIG. 1) which are carried by a cutter head 27 on the upper portion of the base 18. As shown in FIG. 1, a bearing housing 30 on the upper end of the cutter spindle is telescoped slidably within and is keyed against rotation relative to a sleeve 31 which is rotatably supported by the cutter head. The bearing housing 30 supports a pair of combined radial and thrust bearings 33. The depending shaft 34 of a yoke 36 extends through the bearings and is secured thereto in such a manner that up and down movement of the shaft causes up and down reciprocation of the bearing housing 30 and the cutter spindle 13. A spherical bearing surface 38 on the shaft 34 is disposed within the bearings and permits the bearing housing and the cutter spindle to rotate relative to the shaft.

To reciprocate the cutter spindle 13 upwardly and downwardly, a connecting rod 40 (FIG. 1) is pivotally connected at its lower end to the yoke 36 by a horizontal pin 42. The upper end of the connecting rod is pivotally connected by a spherical bearing 43 to a horizontally extending crank pin 44 which is eccentric with respect to a disc 45. The latter is secured to one end of a shaft 46 which is rotatably supported by bearings 47 in the base 18. The other end of the shaft 46 is connected to a drive unit (not shown) adapted to rotate the shaft. As the shaft rotates, the crank pin 44 and the connecting rod 40 shift the cutter spindle 13 downwardly and upwardly to reciprocate the cutter 12 through its cutting and return strokes.

Herein, the cutter spindle 13 is mounted to pivot about an axis extending parallel to the spindle in order to permit the cutter 12 to move laterally away from the gear blank 11 and provide the necessary relief during the return stroke of the cutter. As shown in FIG. 1, the cutter head 27 is pivotally supported on a large-diameter pin 50 which is secured to the base 18, the pin being offset radially from and extending parallel to the cutter spindle 13.

Figure 5:
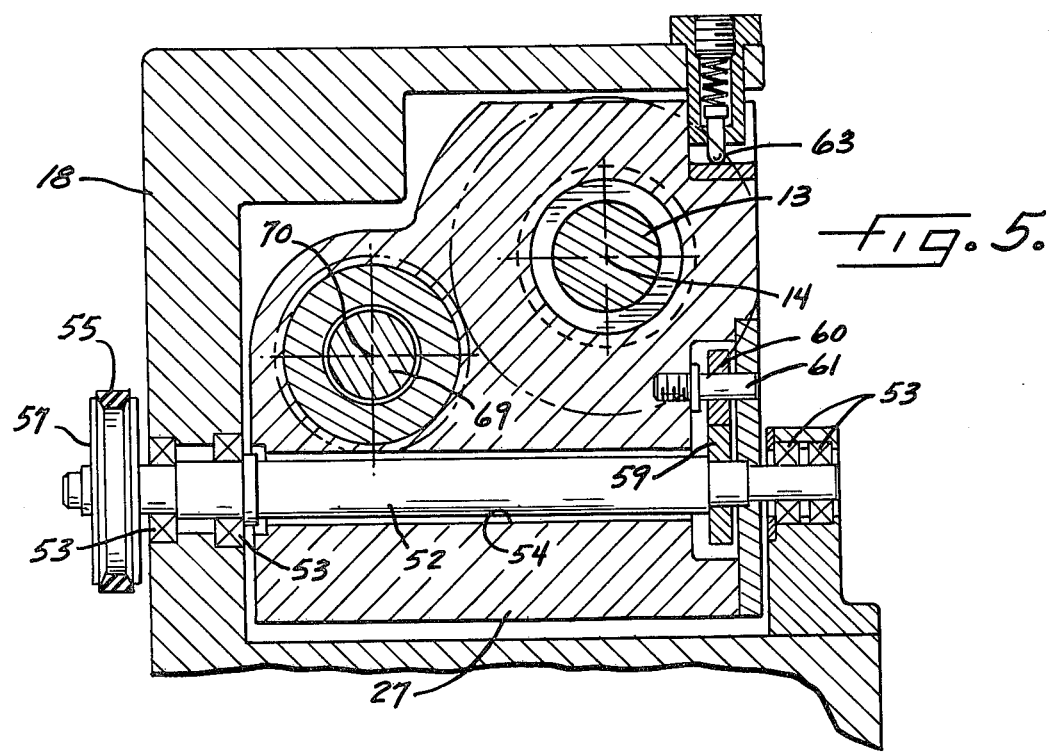
FIG. 5 is an enlarged fragmentary cross-section taken substantially along the line 5—5 of FIG. 1.

To pivot the cutter spindle 13, a cam shaft 52 (FIG. 5) extends transversely of the pin 50 and parallel to the pins 42 and 44 and is journaled for rotation by bearings 53 on the base 18. The cam shaft extends through an oversized opening 54 in the cutter head 27 and is adapted to be rotated by a belt 55 trained around pulleys 56 and 57 on the shafts 46 and 52, respectively. A cam 59 (FIG. 5) is secured to and rotates with one end portion of the cam shaft 52 and is disposed in engagement with a rotatable follower 60 which is mounted within the head 27 by a pin 61. Because of the belt 55, the cam 59 is rotated in timed relationship with up and down reciprocation of the cutter spindle 13.

Just after the cutter 12 has completed each downward cutting stroke, the cam 59 acts against the follower 60 and causes the cutter head 27 to pivot about the pin 50 and in a direction to swing the cutter laterally away from the gear blank 11. The cam causes the cutter to remain out of engagement with the blank as the cutter moves upwardly through its return stroke and thus the necessary relief is effected. When the cutter reaches the top of its return stroke, a fall on the cam permits a spring-loaded plunger 63 (FIG. 5) to pivot the head 27 in the opposite direction about the axis of the pin 50 and thereby return the cutter laterally toward the gear blank and into position for the next cutting stroke. The plunger is supported by the base 18 and acts against one side of the head.

Pivoting of the cutter head 27 relative to the cam shaft 52 is permitted by the oversized hole 54 which is formed in the head and through which the cam shaft extends. The bearings 33, the spherical bearing surface 38 on the shaft 34, and the spherical bearing 43 permit the cutter spindle 13 to swing relative to the crank pin 44 through the limited arc required to provide the clearance.

As mentioned above, relative infeeding of the cutter 12 and the gear blank 11 is effected during the cutting process in order to increase the depth of cut. In accordance with the primary aspect of the present invention, such infeeding is effected by pivoting one of the spindles 13, 16 relative to the other spindle with the pivoting being permitted by a simplified gear train which effects rotation of the spindles in timed relation and which enables the overall cost and complexity of the shaping maching 10 to be significantly reduced.

In the machine 10 shown in FIGS. 1 to 6, the above-mentioned gear train comprises a gear or pinion 65 (FIG. 2) which is operable to effect rotation of the cuter spindle 13. The pinion 65 is secured to the lower end of the sleeve 31 and meshes with a gear or pinion 67 which is secured to the upper end portion of a shaft 69. The latter is coaxial with the pin 50 and is rotatable about an axis 70 spaced radially from and extending parallel to the axes 14 and 15 of the cutter and work spindles 13 and 16. The shaft 69 extends from the housing 20 to the cutter head 27 and is supported to rotate by a sleeve bearing 72 (FIG. 1) in the housing, by a sleeve bearing 73 in the base 18 and by a pair of ball bearings 74 in the head. By virtue of the bearings 74, the head 27 may pivot about the axis 70 of the shaft 69 when the cutter 12 is relieved from and brought back into engagement with the gear blank 11. During such pivoting, the pinion 65 walks around the pinion 67.

A drive unit 78 (shown schematically in FIG. 1) is coupled to the lower end of the shaft 69 and supplies the power for rotating the spindles 13 and 16. A gear or pinion 80 (FIGS. 1 and 2) is fixed to the lower end portion of the shaft 69 and is adapted to rotate the work spindle 16 through gear means. In the present instance, such gear means comprise a pair of superimposed gears or pinions 81 and 82 fixed to the lower end of a shaft 83 and further comprise a gear or pinion 84 fixed to the lower end of the work spindle 16. The pinion 80 meshes with the pinion 81 while the pinion 82 meshes with the pinion 84. The shaft 83 is rotatably journaled by bearings 86 (FIG. 6) in a sleeve 87 which is received in a bore 88 in the housing 20.

With the foregoing arrangement, the shaft 69 is rotated by the drive unit 78. The pinion 67 on the shaft 69 acts through the pinion 65 to rotate the cutter spindle 13 in a direction opposite to the shaft. The work spindle 16 is rotated in timed relation with but in the opposite direction of the cutter spindle by means of the pinions 80, 81, 82 and 84. Thus, the pinion 80 on the shaft 69 drives the pinion 81 to effect turning of the shaft 83 and driving of the pinion 82. The latter drives the pinion 84 so as to rotate the work spindle 16 in the same direction as the shaft 69 and in a direction opposite to the cutter spindle.

In keeping with the invention, relative infeeding of the spindles 13 and 16 is effected by pivoting one of the spindles with respect to the other spindle with one of the aforementioned pinions walking around another of the pinions to permit such pivoting while still maintaining a drive between the spindles. While the infeeding could be effected by physically pivoting the cutter spindle 13, the infeed preferably is carried out by physically pivoting the work spindle 16 so as to avoid the disadvantages otherwise resulting from pivoting of the reciprocating cutter spindle.

To enable pivoting of the work spindle 16 for purposes of infeeding, the housing 20 is mounted to rotate in the bore 21 of the arm 19 and about the axis 70 of the shaft 69, rotation of the housing relative to the shaft being permitted by the sleeve bearing 72. To rotate the housing, a large gear segment 90 (FIG. 4) is carried by the upper side of the housing and meshes with a toothed rack 91 which is guided for back and forth movement by the arm 19. The rod 92 of a reciprocating hydraulic actuator 93 is connected to one end of the rack. When the rod 92 is advanced, the rack 91 acts against the gear segment 90 to turn the housing in a counterclockwise direction (FIG. 4) and feed the gear blank 11 into the cutter 12. Retraction of the rod causes the rack to turn the housing in the opposite direction and retract the gear blank preparatory to the next cutting cycle.

As shown in FIG. 4, the axes 14 and 15 of the cutter and work spindles 13 and 16 lie along a common arc 94 which is struck from the center of the housing 20 and thus from the axis 70 of the shaft 69. The infeeding thus occurs along the arc 94. During the infeeding, the work spindle 16, the shaft 83 and the pinions 84, 82 and 81 swing about the axis 70 of the shaft 69. As an incident thereto, the pinion 81 walks around the pinion 80 and thus maintains an operative drive between the work spindle 16 and the shaft 69 during the infeeding.

From the foregoing, it will be apparent that the present invention brings to the art a new and improved shaping machine 10 in which the cutter and work spindles 13 and 16 are rotated in timed relationship by a very simple drive train consisting of four primary gears 65, 67, 80 and 84 and direction-changing gears 81 and 82. The machine is dedicated essentially to forming a single type of gear or a narrow range of gears and is considerably less expensive and complex than a machine which cuts a wide range of gears and which requires several sets of change gears to establish various timed relationships between the spindles. The use of a gear train with a relatively small number of gears is made possible by the fact that the infeeding is effected by pivoting one of the spindles about the shaft 69 which connects the spindles so that one gear may walk around another to maintain an operative drive between the spindles.

Because the gears 81, 82 and 84, walk around the gear 80 during pivotal infeeding, undesirable differential rotation normally would be imparted to the work spindle 16 during the infeeding. To eliminate such differential rotation, supplemental rotation in the opposite direction is imparted to the work spindle as the infeed occurs. The supplemental rotation rotates the gear blank 11 relative to the cutter 12 independently of the drive unit 78 so as to maintain a constant velocity ratio between the cutter and the gear blank in spite of the differential rotation caused by the pivotal infeeding.

Figure 6:
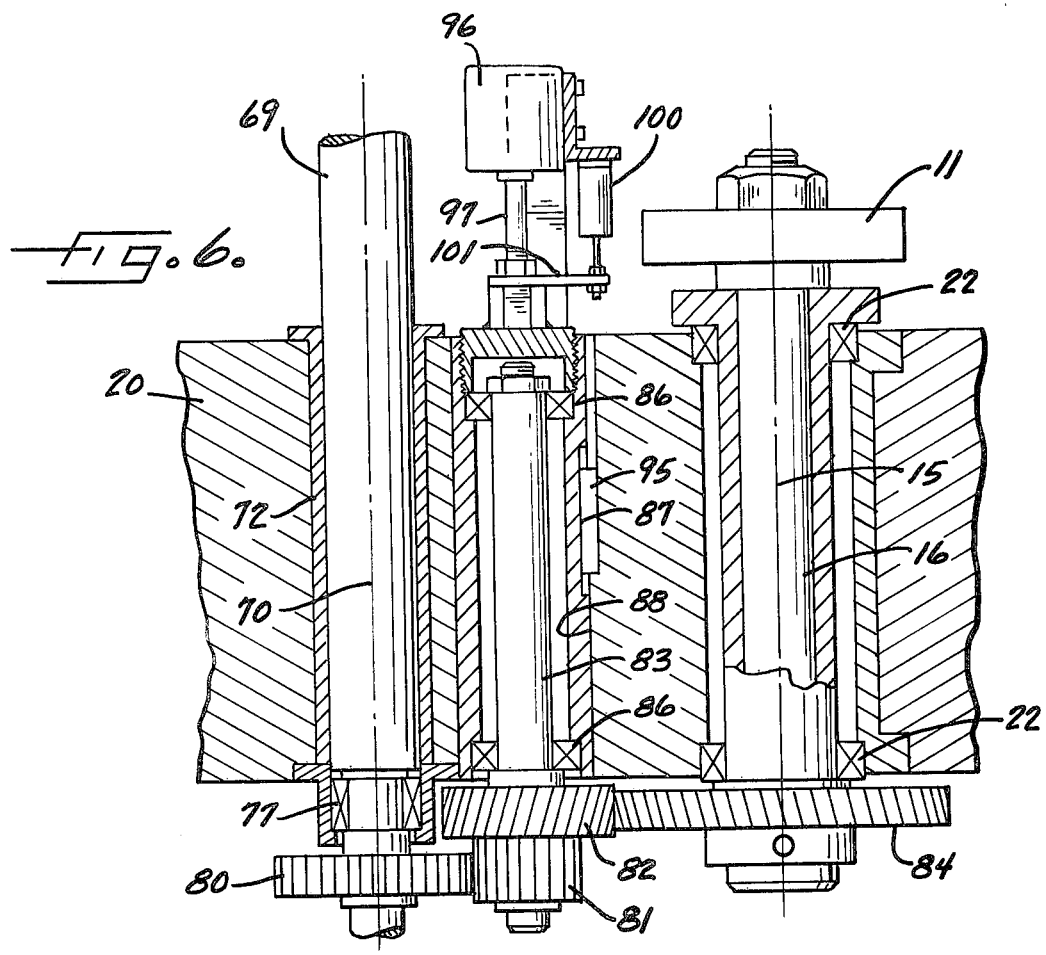
FIG. 6 is an enlarged fragmentary cross-section taken substantially along the line 6—6 of FIG. 4.

While the supplemental rotation could be imparted to the work spindle 16 in various ways, such rotation is effected in the present instance by shifting the shaft 83 axially and by causing the work spindle to rotate as an incident to the axial shifting. More specifically, the sleeve 87 which supports the shaft 83 is mounted to slide upwardly and downwardly in the bore 88 in the housing 20, the sleeve being held against rotation by a key 95 (FIG. 6). Vertical movement of the sleeve 87 is effected by a reciprocating hydraulic actuator 96 having a rod 97 connected to the upper end of the sleeve. When the sleeve 87 is moved vertically, the shaft 83, the bearings 86 and the pinions 81 and 82 all move in unison with the sleeve.

To rotate the work spindle 16 in response to axial movement of the shaft 83, the pinions 82 and 84 are helical gears rather than being straight spur gears as in the case of the pinions 80 and 81. Thus, when the shaft 83 is shifted axially, the helical teeth of the pinion 82 cam against the helical teeth of the pinion 84 and cause the work spindle 16 to rotate supplementally with respect to the rotation imparted to the work spindle by the drive unit 78.

Supplemental rotation is imparted to the work spindle 16 as a function of the distance through which the work spindle is pivoted during infeeding. For this purpose, a linear variable differential transformer (LVDT) 98 (FIG. 4) is associated with a rod 99 which extends from the infeed actuator 93 and which moves in unison with the rod 92 of the actuator. A second LVDT 100 (FIG. 6) is associated with a bar 101 which is connected to the rod 97 of the actuator 96. The LVDT 98 operates in a well known manner to produce an electrical signal which is indicative of the infeed distance of the work spindle 16 and which serves as a command signal for determining the correct axial position of the shaft 83 as a function of the infeed distance. The LVDT 100 produces a feedback signal which is indicative of the actual position of the shaft 83. The two signals are compared in a well known manner and the resultant error signal is used to cause the actuator 96 to shift the shaft 83 to a position which is correlated with the infeed position of the work spindle 16. Reference may be made to Kelly U.S. Pat. No. 3,469,495 for a more detailed disclosure of a system in which linear variable differential transformers control the position of a hydraulic actuator.

The supplemental rotation is in a direction opposite to the differential rotation imparted to the work spindle 16 as a result of the gears 81, 82 and 84 walking around the gear 80. Thus, the machine 10 of the invention provides for imparting supplemental rotation to the work spindle in order to negate the differential rotation occurring during pivotal infeeding.

Figures 7, 8:
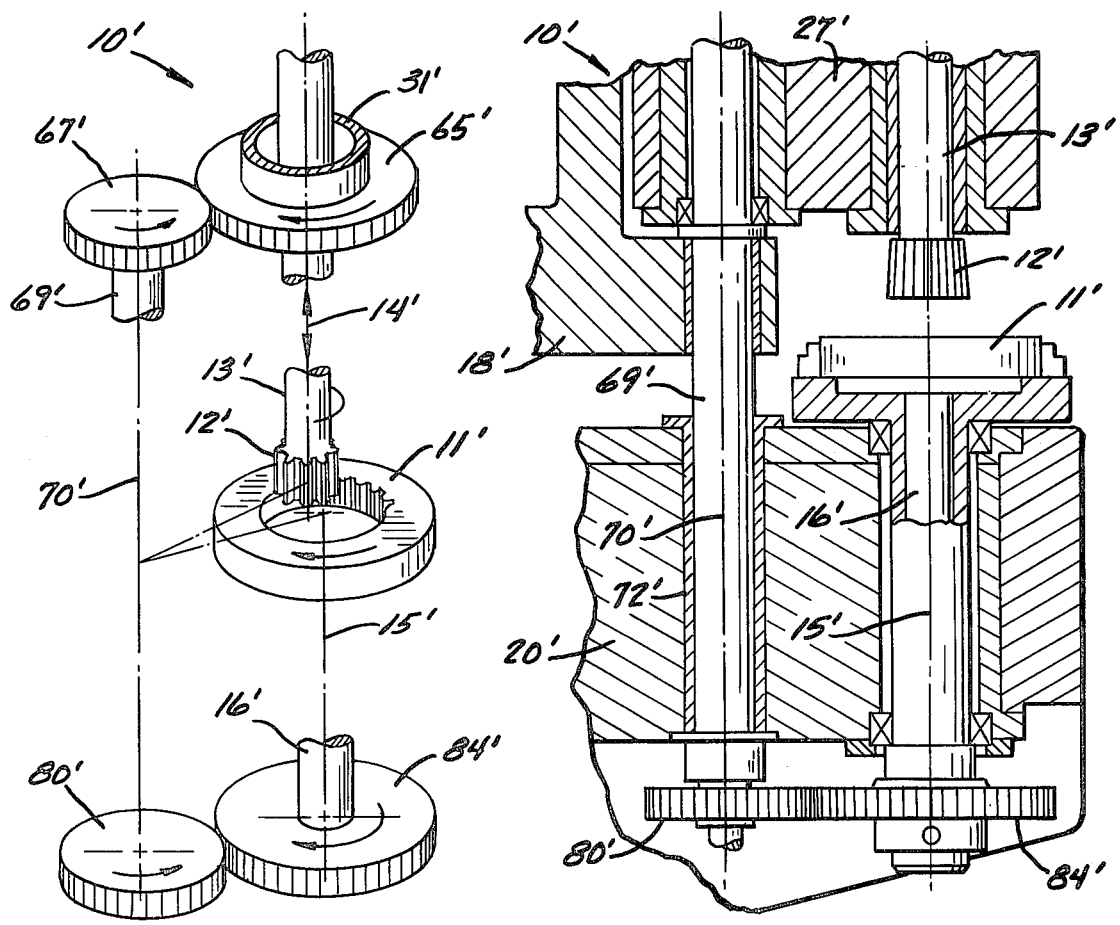
FIG. 7 is a schematic view similar to FIG. 2 but shows the drive train of a modified shaping machine for forming the internal gear.
FIG. 8 is a fragmentary cross-sectional view similar to FIG. 1 but shows certain parts of the modified machine illustrated in FIG. 7.

Another embodiment of a gear shaping machine 10' incorporating the features of the invention is shown in FIGS. 7 and 8 in which parts corresponding to the machine 10 of the first embodiment are indicated by the same but primed reference numerals. The machine 10' is virtually identical to the machine 10 except that the machine 10' is used to form an internal gear (e.g., an internal ring gear) by cutting teeth around the inner periphery of an annular gear blank 11'. When forming an internal ring gear, the gear blank 11' and the cutter 12' are rotated in the same direction.

As shown in FIG. 7, the cutter and work spindles 13' and 16' are positioned such that the cutter 12' is disposed adjacent the inner periphery of the work blank 11'. As before, the axes of the spindles lie along a common arc which is struck from the center of the housing 20' so that the infeeding may be effected by pivoting the housing and the work spindle about the axis of the shaft 69'.

The cutter spindle 13' is rotated by means of a gear 67' on the shaft 69' meshing with a gear 65' on the cutter spindle. The work spindle 16' is rotated by means of a gear 80' on the shaft 69' meshing directly with a gear 84' on the work spindle. Because the gear 80' meshes directly with the gear 84', the work spindle 16' is rotated in the same direction as the cutter spindle 13'. During infeeding, the gear 84' walks directly around the gear 80'. Suitable means (not shown) may be incorporated as, for example, on the sleeve 74' to impart supplemental rotation to the work spindle and thereby compensate for the differential rotation produced during pivotal infeeding.

Because only four gears 65', 67', 80' and 84' are required, the drive train between the spindles of the internal shaper 10' is extremely simple.

We claim:

1. A machine having a shaping cutter for generating a plurality of spaced teeth around the periphery of a workpiece, said machine comprising rotatable cutter and work spindles respectively supporting said cutter and said workpiece for rotation about spaced parallel axes coinciding with the axes of said spindles, means for reciprocating said cutter spindle lengthwise to cause said cutter to move back and forth relative to said workpiece through an active cutting stroke and an inactive return stroke, and means for moving said cutter laterally toward and away from said workpiece in timed relation with the cutting and return strokes of the cutter so as to cause the cutter to engage the workpiece during said cutting stroke and to clear the workpiece during said return stroke, and drive means for rotating said spindles in timed relation with one another, said machine being characterized in that said drive means comprise first and second gears, one of said gears being coaxial with and fixed to said cutter spindle, the other of said gears being coaxial with and fixed to said work spindle, a shaft rotatable about an axis extending parallel to and spaced radially from the axes of said cutter and work spindles, a third gear coaxial with and fixed to said shaft and meshing with said first gear so as to rotate said first gear as an incident to rotation of said shaft, fourth gear means rotatably connecting said shaft with said second gear, said fourth gear means comprising a fourth gear coaxial with and fixed to said shaft, the axes of said spindles being disposed along a common arc struck from the axis of said shaft, means mounting one of said spindles for pivotal movement relative to the other spindle along said arc and about the axis of said shaft thereby to enable relative infeeding of the cutter and the workpiece, and means for moving said one spindle along said arc to effect said infeeding, the gear fixed to said one spindle orbiting around the axis of said shaft and remaining operably connected to said shaft during said infeeding.

2. A machine as defined in claim 1 in which said work spindle is the spindle which is mounted for pivotal movement.

3. A machine as defined in claim 1 in which said first gear and second gear are fixed to said cutter spindle and said work spindle, respectively.

4. A machine as defined in claim 3 in which said cutter generates said teeth around the external periphery of said workpiece, said first and third gears meshing directly with one another whereby said cutter spindle rotates in a direction opposite to said shaft, said fourth gear means further comprising an idler gear interposed between said second and fourth gears and causing said shaft to rotate in the same direction as said work spindle.

5. A machine as defined in claim 3 in which said workpiece is annular and in which said cutter generates said teeth around the internal periphery of said workpiece, said first and second gears meshing directly with said third and fourth gears, respectively, whereby both of said spindles rotate in the same direction and in a direction opposite to rotation of said shaft.

6. A machine as defined in claim 1 further including means for impairing supplemental rotation to one of said spindles apart from the rotation imparted to such spindle by said drive means and by said infeeding.

7. A machine as defined in claim 6 in which said last-mentioned means impart said supplemental rotation to said shaft as a function of the distance of said infeeding.

8. A machine as defined in claim 7 in which said last-mentioned means impart said supplemental rotation to said work spindle.

9. A machine having a shaping cutter for generating a plurality of spaced teeth around the periphery of a workpiece, said machine comprising rotatable cutter and work spindles respectively supporting said cutter and said workpiece for rotation about spaced parallel axes coinciding with the axes of said spindles, means for reciprocating said cutter spindle lengthwise to cause said cutter to move back and forth relative to said workpiece through an active cutting stroke and an inactive return stroke, and means for moving said cutter laterally toward and away from said workpiece in timed relation with the cutting and return strokes of the cutter so as to cause the cutter to engage the workpiece during said cutting stroke and to clear the workpiece during said return stroke, and drive means for rotating said spindles in timed relation with one another, said machine being characterized in that said drive means comprise a first gear coaxial with and fixed to said cutter spindle, a second gear coaxial with and fixed to said work spindle, a shaft rotatable about an axis extending parallel to and spaced radially from the axes of said cutter and work spindles, a third gear coaxial with and fixed to said shaft and meshing directly with one of said first and second gears so as to rotate said one gear as an incident to rotation of said shaft, fourth gear means rotatably connecting said shaft with the other of said first and second gears, said fourth gear means including a fourth gear coaxial with and fixed to said shaft, the axes of said spindles being disposed along a common arc struck from the axis of said shaft, means mounting said work spindle for pivotal movement relative to said cutter spindle along said arc and about the axis of said shaft thereby to enable relative infeeding of the cutter and the workpiece, and means for moving said work spindle along said arc to effect said infeeding, the gear connected to said work spindle orbiting around the axis of said shaft and remaining operably connected to said shaft during such movement.

10. A machine as defined in claim 9 in which said first gear and second gear are fixed to said cutter spindle and said work spindle, respectively.

11. A machine as defined in claim 10 in which said cutter generates said teeth around the external periphery of said workpiece, said first and third gears meshing directly with one another whereby said cutter spindle rotates in a direction opposite to said shaft, said fourth gear means further comprising an idler gear interposed between said second and fourth gears and causing said shaft to rotate in the same direction as said work spindle.

12. A machine as defined in claim 10 in which said workpiece is annular and in which said cutter generates said teeth around the internal periphery of said workpiece, said first and second gears meshing directly with said third and fourth gears, respectively, whereby both of said spindles rotate in the same direction and in a direction opposite to rotation of said shaft.

13. A machine having a shaping cutter for generating a plurality of spaced teeth around the periphery of a workpiece, said machine comprising rotatable cutter and work spindles respectively supporting said cutter and said workpiece for rotation about spaced parallel axes coinciding with the axes of said spindles, drive means for rotating said spindles in timed relation with one another, means for reciprocating said cutter spindle lengthwise to cause said cutter to move back and forth relative to said workpiece through an active cutting stroke and an inactive return stroke, and means for moving said cutter laterally toward and away from said workpiece in timed relation with the cutting and return strokes of the cutter so as to cause the cutter to engage the workpiece during said cutting stroke and to move past the workpiece with clearance during said return stroke, the improvement in said machine comprising, means for pivotally infeeding one of said spindles toward the other of said spindles to change the depth of cut of the cutter into said workpiece, and means for imparting supplemental rotation to one of said spindles as a function of the distance of said infeeding and separate from the rotation imparted to such spindle by said drive means.

* * * * *